United States Patent
Knudsen et al.

(10) Patent No.: US 8,371,263 B2
(45) Date of Patent: Feb. 12, 2013

(54) CONNECTING ROD

(75) Inventors: Julian R. Knudsen, North Prairie, WI (US); David T. Borth, Watertown, WI (US); Wayne G. Seaberg, Delafield, WI (US)

(73) Assignee: Dresser, Inc., Addison, TX (US)

( * ) Notice: Subject to any disclaimer, the term of this patent is extended or adjusted under 35 U.S.C. 154(b) by 594 days.

(21) Appl. No.: 12/415,665

(22) Filed: Mar. 31, 2009

(65) Prior Publication Data

US 2010/0242896 A1 Sep. 30, 2010

(51) Int. Cl.
*F16C 7/02* (2006.01)

(52) U.S. Cl. .............. 123/197.3; 123/197.4; 123/197.1; 74/579 R; 74/579 E; 74/593

(58) Field of Classification Search .............. 123/197.3, 123/197.4, 197.1; 74/579 R, 579 E, 593
See application file for complete search history.

(56) References Cited

U.S. PATENT DOCUMENTS

| | | | |
|---|---|---|---|
| 2,473,096 A * | 6/1949 | Hamill et al. ................ | 384/430 |
| 3,482,468 A | 12/1969 | Biasse | |
| 3,730,020 A | 5/1973 | Di Matteo, Sr. et al. | |
| 4,463,710 A * | 8/1984 | McWhorter ................ | 123/48 B |
| 4,541,304 A | 9/1985 | Chikugo et al. | |
| 4,688,446 A * | 8/1987 | Ishikawa ..................... | 74/579 E |
| 4,693,139 A | 9/1987 | Mukai et al. | |
| 4,905,540 A | 3/1990 | Hughes et al. | |
| 5,154,098 A | 10/1992 | Maumus | |
| 5,524,507 A | 6/1996 | Olmr et al. | |
| 5,722,036 A | 2/1998 | Shikata et al. | |
| 5,758,550 A | 6/1998 | Lenczyk | |
| 6,027,784 A | 2/2000 | Taguchi | |
| 6,357,321 B1 * | 3/2002 | Schmitt ..................... | 74/579 E |
| 6,513,238 B1 | 2/2003 | Schlegel | |
| 6,622,669 B1 * | 9/2003 | Rao et al. ................... | 123/48 B |

(Continued)

FOREIGN PATENT DOCUMENTS

| | | |
|---|---|---|
| DE | 197 56 509 A 1 | 6/1998 |
| DE | 10 2004 024 576 A1 | 12/2005 |

(Continued)

OTHER PUBLICATIONS

Machine translation of JP2003004024A, Detailed Description and Claims.*

(Continued)

*Primary Examiner* — Nathaniel Wiehe
*Assistant Examiner* — Grant Moubry
(74) *Attorney, Agent, or Firm* — Woodcock Washburn LLP

(57) ABSTRACT

A connecting rod includes an elongate rod shank with a small end at a first axial end of the rod shank and a big end at the second axial end of the rod shank. The big end includes a body part and a cap part adapted to releasably couple to the body part. When the cap part is coupled to the body part, the cap part and body part cooperate to define a crank pin receiving bore and abut at first and second spaced apart interfaces. The cap part defines an aperture proximate the first interface that is adapted to receive a threaded fastener that engages and clamps the cap part to the body part. The cap part includes a side portion that extends radially beyond a largest radius from a crank pin bore center to the first interface. The side portion is substantially radially concentrated adjacent the first interface.

22 Claims, 3 Drawing Sheets

U.S. PATENT DOCUMENTS

| | | | |
|---|---|---|---|
| 6,883,483 B1 | 4/2005 | Knudsen et al. | |
| 6,968,822 B2* | 11/2005 | Yamada et al. | 123/192.2 |
| 7,111,604 B1* | 9/2006 | Hellenbroich et al. | 123/197.3 |
| 7,217,035 B2* | 5/2007 | Damour | 384/429 |
| 7,703,431 B2* | 4/2010 | Genter | 123/197.3 |
| 2002/0148325 A1* | 10/2002 | Bergsma | 74/593 |
| 2003/0066579 A1* | 4/2003 | Bergsma | 148/549 |
| 2004/0187837 A1* | 9/2004 | Meyer | 123/197.3 |
| 2005/0263126 A1 | 12/2005 | Yamaguchi et al. | |
| 2006/0260433 A1 | 11/2006 | Kubota et al. | |
| 2007/0137422 A1 | 6/2007 | Betzmeir | |
| 2008/0078354 A1* | 4/2008 | Smith et al. | 123/197.4 |

FOREIGN PATENT DOCUMENTS

| | | |
|---|---|---|
| DE | 10 2004 046 064 A1 | 4/2006 |
| EP | 1 179 663 | 2/2002 |
| EP | 2037088 | 3/2009 |
| EP | 2123375 | 11/2009 |
| GB | 1 207 298 | 9/1970 |
| GB | 2 295 217 A | 5/1996 |
| JP | 59099107 | 6/1984 |
| JP | 2002147432 | 5/2002 |
| JP | 2003004024 A * | 1/2003 |
| JP | 2007078071 | 3/2007 |
| JP | 2007078072 | 3/2007 |
| SU | 973965 | 11/1982 |
| WO | 2007/015879 | 2/2007 |
| WO | 2008/011069 | 1/2008 |
| WO | 2010/081456 | 7/2010 |

OTHER PUBLICATIONS

International Search Report and Written Opinion of the International Searching Authority issued in International Application No. PCT/US2010/029427 on Sep. 6, 2010; 10 pages.

* cited by examiner

CONNECTING ROD

TECHNICAL FIELD

This description relates to internal combustion engines, and in particular connecting rods for use in connecting a piston to a crankshaft.

BACKGROUND

Connecting rods are employed in reciprocating piston engines to connect pistons to the crankshaft. Connecting rods allow the reciprocating motion of the piston to be translated into rotational motion of the crankshaft. The connecting rod can be subjected to enormous stress from the changing forces acting on those points where the rod connects to the piston and the crankshaft. In internal combustion engines, the piston is provided within a piston cylinder, its reciprocating motion guided laterally by the cylinder wall. Portions of the connecting rod are also typically within the engine cylinder, reciprocating in conjunction with the piston within the cylinder. The forces applied to the connecting rod can potentially result in wear and damage to the connecting rod.

SUMMARY

In one aspect, the disclosure encompasses a connecting rod that includes an elongate rod shank with a small end at a first axial end of the rod shank and a big end at the second axial end of the rod shank. The big end includes a body part and a cap part adapted to releasably coupled to the body part. When the cap part is coupled to the body part, the cap part and body part cooperate to define a crank pin receiving bore and abut at first and second spaced apart interfaces. The cap part defines an aperture proximate the first interface that is adapted to receive a threaded fastener that engages and clamps the cap part to the body part. The cap part includes a side portion that extends radially beyond a largest radius from a crank pin bore center to the first interface. The side portion is substantially radially concentrated adjacent the first interface.

In one aspect, the disclosure encompasses an engine with an engine block defining a piston cylinder, a crank having a crank pin and being supported to rotate in the engine block, a piston residing in the piston cylinder, and an elongate connecting rod connecting the crank to the piston. The connecting rod is coupled to the crank pin at a big end of the connecting rod. The big end of the connecting rod includes a body part and a cap part releasably coupled to the body part by a plurality of threaded fasteners. The cap part abuts the body part at first and second spaced apart interfaces. The cap part, in a region adjacent the first interface, extends laterally beyond the first interface. The cap part has a lateral dimension greater than an inner diameter of the cylinder and smaller than a largest lateral dimension of the connecting rod.

In one aspect, the disclosure encompasses a method of operating an engine. According to the method, a piston that is reciprocating within a cylinder of the engine is connected to a crank of the engine with an elongate connecting rod. The elongate connecting rod includes a body part and a cap part releasably coupled to the body part by a plurality of threaded fasteners and abutting the body part at first and second spaced apart interfaces. Loads exerted by the crank on the connecting rod are supported with a region of the cap part adjacent the first interface that extends laterally beyond the first interface. The connecting rod in the region adjacent the first interface has a largest lateral dimension that is greater than an inner diameter of the cylinder and smaller than a largest lateral dimension of the connecting rod.

The features above can include one or more or none of the following features. The cap part and the body part can include interlocking peaks and valleys at the first interface. The side portion can extend radially beyond the body part about the first interface. The side portion can extend radially beyond the first interface in an amount greater than the body part extends radially beyond the first interface. The side portion can extend radially beyond the first interface in an amount greater than the cap part extends radially beyond the second interface. A total volume of the side portion radially beyond a plane through an end of the first interface and orthogonal to the first interface has a centroid, and the centroid can reside radially within a smallest radius from the crank pin bore center to a perimeter of the cap part. The side portion can reside radially within a largest radius from the crank pin center to a perimeter of the cap part. The first and second interfaces can be non-orthogonal to the longitudinal axis of the rod shank. The first and second interfaces can be coplanar.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Various implementations of a connecting rod are provided in an engine for connecting a crankshaft to a piston to translate the reciprocating motion of the piston into rotational motion at the crankshaft. One or more connecting rods may be provided within the engine, typically one per piston of the engine. The connecting rod has a small end adapted to connect to the piston, and a big end adapted to connect to the crankshaft. The big end incorporates a separable cap part adapted to allow the big end to receive a crank pin of the crankshaft. A side portion is provided on the cap part, extending radially beyond an interface between the cap part and the remainder of the big end.

Figure 1:
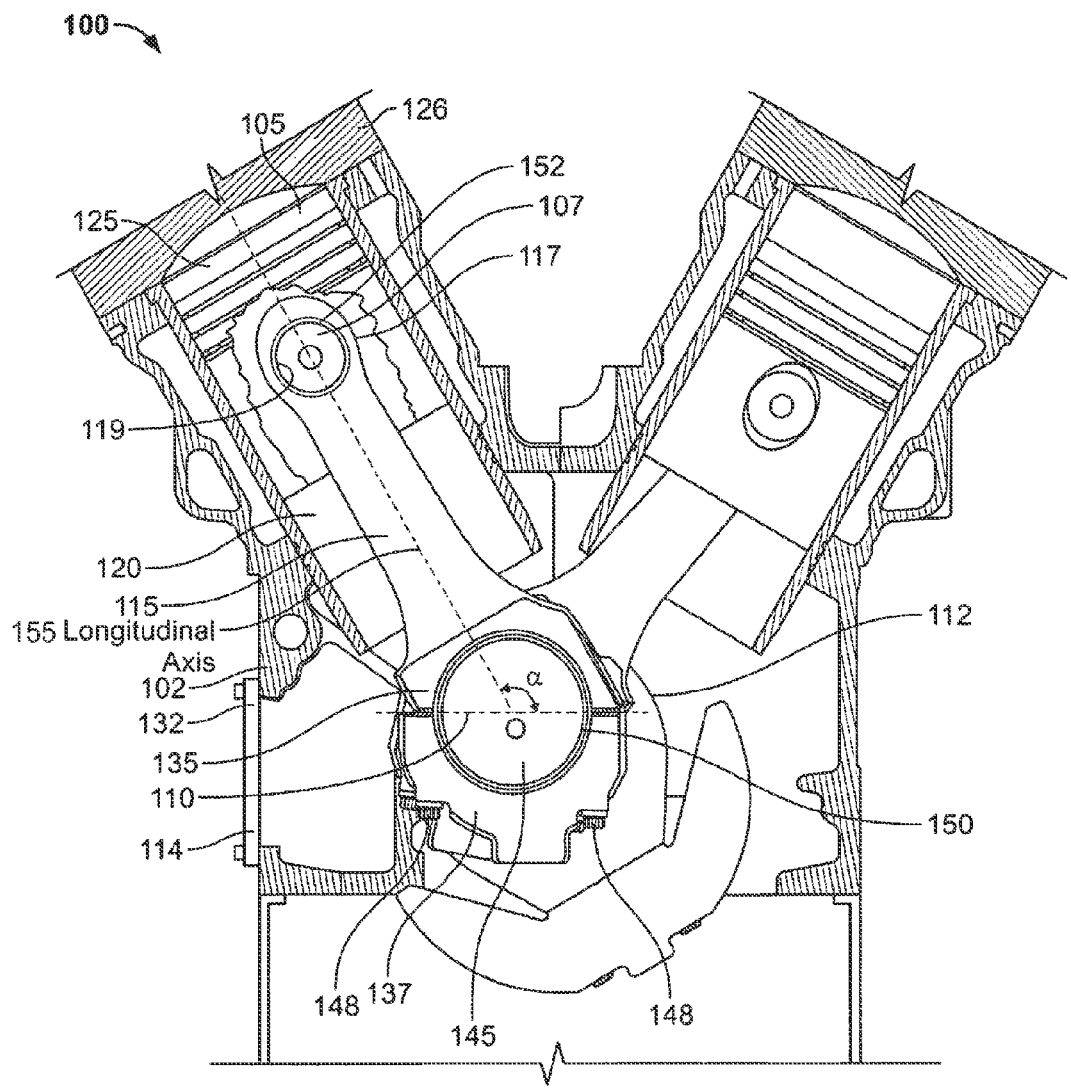
FIG. 1 is a cross-sectional view of an engine incorporating a connecting rod constructed in accordance with the concepts described herein.

As shown in FIG. 1, in some examples, an engine 100 is provided with an engine block 102, a piston 105 and a crankshaft 112. A connecting rod 115 connects the piston 105 to a crankpin 110 of the crankshaft 112. The connecting rod 115 connects to a wrist pin 107 of the piston 105 at a small end 117 of the connecting rod 115 and to the crankpin 110 at a big end 135. The small end 117 has a bore hole 119 that closely receives the wrist pin 107 and may be sleeved or otherwise formed to define a bearing 152 (e.g., a journal type bearing or other bearing). Similarly, the big end 135 has a bore hole 145 that closely receives the crank pin 110 and may be sleeved or otherwise formed to define a bearing 150 (e.g., a journal type bearing or other bearing). The piston 105 can be provided in a cylinder 120. A top end 125 of the cylinder 120 is typically closed off by a cylinder head 126 and the opposing end of the cylinder 120 is open. The cylinder 120 can be configured so as to constrain the lateral movement of the piston 105 as it reciprocates in the cylinder 120. At least some portion of the connecting rod 115 is disposed within the cylinder 120, with at least a portion disposed outside the cylinder 120, accommodating the motion of the big end 135 of the connecting rod 115 moving in coordination with the cycling motion of the crankpin 110. The engine 100 may have a single cylinder configuration, comprising a single cylinder 120, piston 105, crankpin 110, and connecting rod 115, or may be a multicylinder engine 100 comprising multiple cylinders 120, pistons 105, crankpins 110 and connecting rods 115. In a multicylinder engine 100, the number of pistons 105, crankpins 110 and connecting rods 115 correspond in number with the number of cylinders 120. Also, the engine 100 can be in different cylinder configurations, for example, a "V" configuration, straight-line configuration, or another reciprocating engine configuration.

In some examples, the connecting rod 115 has a cap part 137 at the big end 135. The cap part 137 is releasably coupled to the remainder of the connecting rod 115, allowing for the crankpin 110 to be received into the bore 145 of the big end 135. Once the crankpin 110 is positioned in the bore 145, the cap part 137 can be replaced and fastened to the remainder of the connecting rod 115 so as to closely receive the crankpin 110 within the bore 145. In some implementations, fasteners 148 received in apertures of the cap part 137 and remaining big end 135 engage the cap part 137 and remaining big end 135 and clamp the cap part 137 to the remainder of the connecting rod 115, although other fastening mechanisms can be implemented to fasten the cap part to the connecting rod 115. The displaceable nature of the cap part can aid, not only in connecting the connecting rod 115 to the crankpin 110, but also in ingress of the connecting rod 115 into the cylinder 120, positioning the bearing 150 around the crankpin 110 within the bore 145, replacing worn bearings 150, or providing other service.

Some implementations of the engine 100 provide for service access ports 132, allowing access to the engine's 100 internal components, including the cylinders 120, pistons 105, crank 112, and connecting rod 115. Access ports facilitate access and thus assembly and service of internal components of the engine 100, such as the connecting rods 115 and associated bearings and fastening mechanisms. In FIG. 1, the access ports are provided through one or more access panels 114 on the side of the engine 100 (e.g., through the side of the engine block 102).

To further convenience servicing of the engine 100, the connecting rod 115 can be provided with fasteners 148 disposed so as to be accessible through an access port (e.g., access panel 114). For example, as illustrated in FIG. 1, the cap part 137 can attach to the remainder of the connecting rod 115 at an angle a, relative the central longitudinal axis 155 of the rod. Such an orientation, in some implementations, can serve to point the heads of the fasteners 148 toward an access port (e.g., access panel 114), facilitating access to allow tightening/loosening fasteners 148 to displace the cap part 137 and the crankpin 110 and surrounding bearing 150 to be serviced. Other cap part 137 designs employing other fastener types can be similarly oriented to allow convenient access through an access port 132 of the engine 100.

Some implementations of engine 100 provide for connecting rods 115 adapted to pass through the cylinder 120, so as to permit a connecting rod 115, pre-connected to a piston 105, to be positioned into the cylinder 120 from the top end 125 of the cylinder 120. Connecting rod constructions adapted to pass through the cylinder 120 can also ease servicing of the connecting rod-piston assembly by allowing the assembly to be wholly or partially removed from the cylinder 120 through the top end 125 of the cylinder 120 (with the cylinder head 126 removed), while the connecting rod 115 is connected to the piston 105. In that the size of the small end is already adapted to fit and move within the cylinder 120 in coordination with the piston 105, adapting the connecting rod 115 to pass through the cylinder 120 can result in limiting the maximum lateral dimension of the big end 135 to slightly smaller than the diameter of the cylinder 120.

In some implementations of the engine 100, limiting the dimensions of the big end 135 can lead to constraints on the amount of material used at the big end 135 for supporting the loading encountered during rotation of crankshaft 110. Sacrificing structure on the big end 135 to allow passage of the connecting rod 115 through the cylinder 120, while easing construction and maintenance of the connecting rod-piston assembly, can limit the supportive capabilities of the connecting rod's 115 connection to the crankshaft 110. In some implementations of the engine 100, the forces exerted on the big end 135, due to the reciprocating, driving force loads of piston 105, can cause damage to the big end bore 145 due to inadequate supportive structure at the big end 135. For example, over time, flexure in the big end 135 can lead to ovalization of the bore 145, fretting, and stress fractures, which can eventually lead to failure of the connecting rod 115 and catastrophic failure of the engine 100. Providing appropriate support to the big end 135 can, among other benefits, reduce ovalization, fretting and stress fractures and help ensure uniform distribution of lubrication at the connecting rod-crankpin connection, as well as lubrication of the big end bearing 150.

Figure 2B:
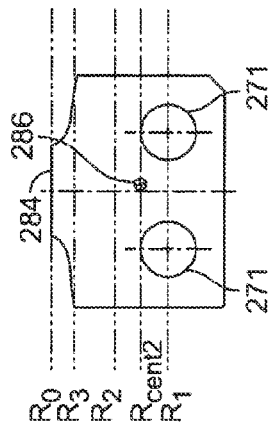
FIG. 2B is a first cross-sectional view of the big end cap of FIG. 2A showing the location of one implementation of a sectional centroid.
Figure 2C:
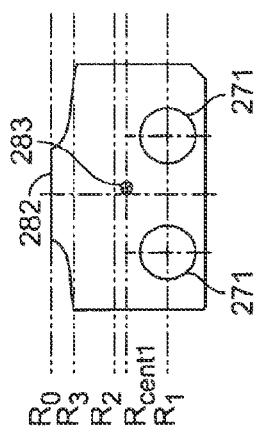
FIG. 2C is a second cross-sectional view of the big end cap of FIG. 2A showing the location of another implementation of a sectional centroid.
Figure 2A:
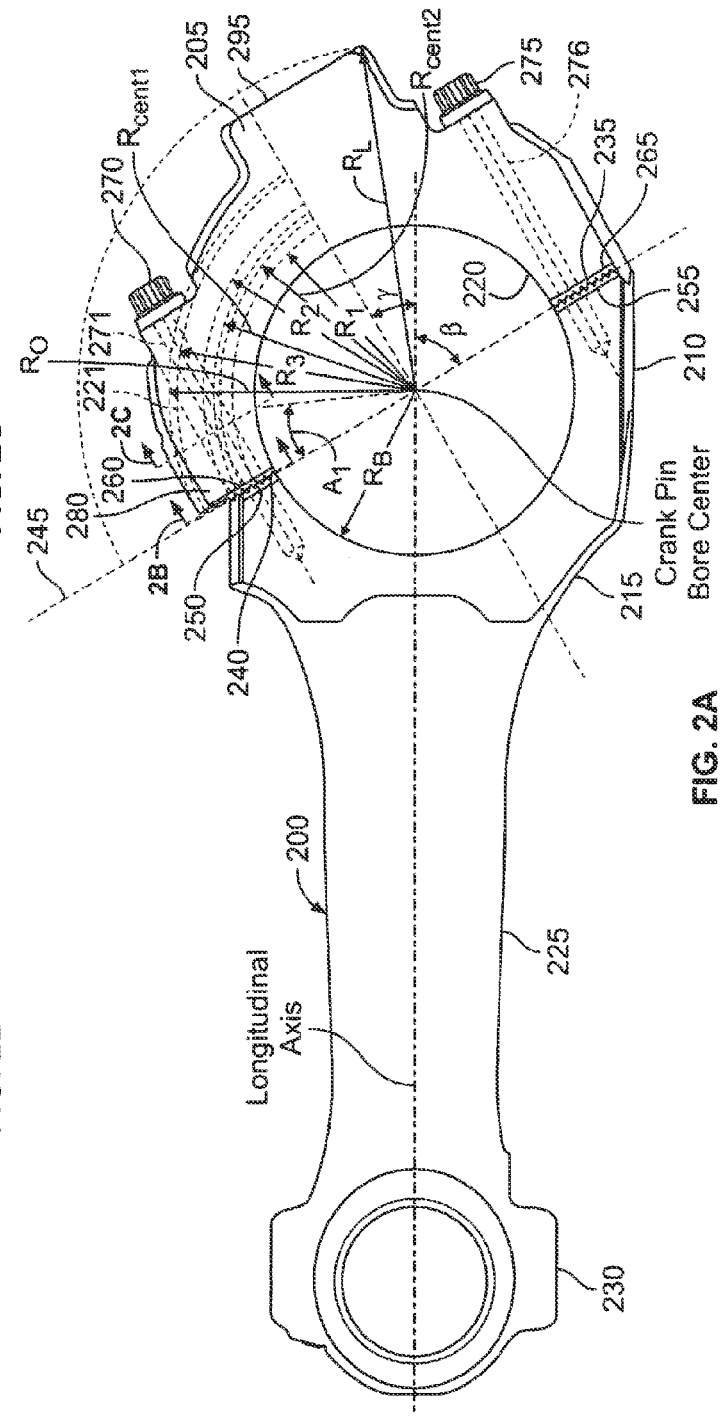
FIG. 2A is a front view of one implementation of a connecting rod depicted proportionally to scale.

As shown in FIG. 2A, one example of a connecting rod 200 is provided with a releasably coupled cap part 205 at the big end 210. The cap part 205 is capable of joining to a rigidly connected body part 215 of the big end 210 to form the crank pin bore 220 of radius $R_B$ at the big end 210. The body part 215 is connected to a rod shank 225. The rod shank 225 is configured to accept and translate loads acting on the connecting rod 200 through the connecting rod 200 to a wrist pin of a piston at small end 230 and a crankshaft pin of a crank at big end 210.

The cap part 205 abuts the body part 215 at two interfaces 235 and 240. Some implementations of big end 210 may provide for interfaces 235 and 240 defining a split line axis 245, in that the split line axis 245 coincides with the interfaces 235 and 240. While FIG. 2A shows interfaces 235 and 240 oriented coplanar, the interfaces might assume a non-coplanar configuration. Additionally, some implementations of the connecting rod 200 may provide for interfaces 235, 240 defining a split line axis 245 angled from a longitudinal axis of the rod shank 225 of the connecting rod 200 by a non-right angle $\beta$. The angular offset $\beta$ of the split line axis may be a positive or negative angle relative to the longitudinal axis.

Each interface 235, 240 is defined by abutting coupling surfaces 250, 255 of the rigid portion of the big end 215 and coupling surfaces 260, 265 of the cap part 205. The coupling surfaces 250, 255, 260, 265 may be substantially flat or may be provided with interlocking peaks and valleys. The interlocking peaks and valleys of example surfaces 250, 255, 260, 265 are illustrated in FIG. 2A as substantially linear troughs and ridges oriented parallel to a central axis of the crank pin bore; however, other configurations can be used. One such example is cracked rod manufacturing, where the cap part 205 and the body part 225 can be manufactured by cracking the cap part 205 from a unitary big end 215 piece to form distinct body part 225 and cap part 205 elements. Cracking the cap part 205 from the body part 225 under force results in an irregular fissure between the pieces, also providing coupling surfaces 250, 255, 260, 265 with interlocking peaks and valleys. The interlocking peaks and valleys of surfaces 250, 255, 260, 265 can serve to provide additional engagement at the interfaces 235, 240, and thus, rigidity to the connection of the cap part 205 with the body part 215. Threaded fasteners 270, 275 can also be provided, such as screws, bolts, studs with nuts, or other fasteners, for affixing the cap part 205 to the body part 215. The fasteners 270, 275 are received in apertures 271, 276 extending through the cap part 205 and body part 215 proximate (in or near) the interfaces 235, 240. The fasteners 270, 275 engage the cap part 205 and body part 215 and clamp the cap part 205 to the body part 215. As illustrated in the example of FIG. 2A, orienting the coupling interfaces 235, 240 at an angle relative the central longitudinal axis, can serve to orient the position of the fasteners 270, 275, for example, by tipping the fastener ends an angle y from the central longitudinal axis. The fasteners 270, 275 may be tipped or otherwise oriented so as to provide easier access for servicing, for example by tipping the fastener ends (e.g., ends having bolt heads or nuts) toward a service access of the engine.

The cap part 205 is provided with a balancing protrusion 295. The balancing protrusion 295 can be a mass of material disposed on the perimeter of the cap part 205 so as to balance the big end 210 of the connecting rod 200.

The cap part 205 is provided with a side protrusion 280 adjacent one of the interfaces 240. The side protrusion 280 extends radially beyond the interface 240 to provide additional material to the big end 210, thereby providing additional rigidity to the big end 210 (particularly the connection between the cap part 205 and the body part 215) and to the bore 220. The geometry, size, and location of the side protrusion 280 may be optimized based on the size and geometry of the remaining connecting rod elements as well as the functional requirements of the connecting rod 200. In certain instances, the geometry, size, and placement of the side protrusion 280 can be optimized so as to provide for maximum big end bore 220 strength. For example, although the geometry, size, and placement of the side protrusion 280 can take many forms, the most effective placement of additional material is concentrated radially adjacent the interface 240, rather than far outboard of the interface 240. Material placed radially beyond the smallest radius from the center of the bore 220 to the perimeter of the cap part 205 has reduced effectiveness. Further, some implementations of the cap strengthening side protrusion 280 may be limited in size and geometry to allow for clearance of the big end 210 during operation of the engine. For example, the interior geometry of the engine, as well as the geometry of the engine block-cylinder interface may only permit cap parts 205 of limited size.

FIG. 2A shows one example of the side protrusion 280. In the illustrated example, the interface 240 extends from radius $R_B$ (from the crank pin bore 220 center) to a radius $R_2$, with its center at radius $R_1$. The inner boundary 221 of the example side protrusion 280 begins at the end of interface 240 (radius $R_2$) and extends orthogonal to the interface surface 240. In the plane of the interface 240, the example side protrusion 280 extends to a radius $R_O$, beyond the edge of the body portion adjacent the interface 240. Radius $R_O$ is smaller than a largest radius $R_L$ of the cap part 205, and approximately the same as (equal to, slightly larger or slightly smaller within about 10%) the smallest radius $R_3$ of the cap part 205 (shown slightly larger than $R_3$). The example side protrusion 280 extends further beyond the interface 240 than any other portion of the connecting rod 200 (e.g., the body part 215 or another portion of the cap part 205) adjacent an interface 235, 240 extends beyond the adjacent interface 235, 240. The perimeter surface of the example side protrusion 280 extends from radius $R_O$ substantially orthogonal to the plane of the interface 240 for a portion before beginning to curve inward, but could be another shape. In the illustrated example, the entire side protrusion 280 resides within radius $R_L$. The example side protrusion 280 is longer, measured perpendicular from the plane of the interface 240, than it is wide. The example side protrusion 280 is substantially radially concentrated adjacent the interface 240, and in the illustrated example, a centroid of the example side protrusion 280 is radially within the smallest radius $R_3$ of the cap part 205, at radius $R_{CENT}$.

FIGS. 2B and 2C show examples of the location of the centroid of the big end cap 205. FIGS. 2B and 2C are cross-sectional views of the big end cap 205 corresponding respectively to call-outs 2B and 2C shown in FIG. 2A. The cross-section 282 illustrated in FIG. 2B corresponds to a section referenced by call-out 2B near or at the cap interface 240. As shown, in this example, a sectional centroid 283 corresponding to 2B is located at the centroid radius $R_{CENT1}$ positioned between center interface radius $R_1$ and the smallest outer cap part radius $R_3$. In the example of FIG. 2C, the sectional centroid 286 is shown in a cross-section 284 of big end cap 205 corresponding to call-out reference 2C. Cross-section 284 is oriented parallel to the cross-section 282 but displaced from cross-section 282, and cap interface 240, by an angle $A_1$. At an angle $A_1=25$ degrees, the centroid radius $R_{CENT2}$ of the sectional centroid of section 284 is also located between center interface radius $R_1$ and the smallest outer cap part radius $R_3$, as shown in FIGS. 2A and 2C. In the example of FIG. 2C, the centroid radius $R_{CENT2}$ of the centroid 286 of cross-section 284 is shorter than the centroid radius $R_{CENT1}$ of the centroid 283 of cross-section 282. At other sections between sections 282 and 284, the centroid is located between center interface radius R1 and the smallest outer cap part radius R3, for example, a section located at an angle $A_1=12.5$ degrees and parallel with the cross-sections illustrated in FIGS. 2A and 2B (i.e., 282 and 284).

Returning to FIG. 2A, it should be noted that the side protrusion 280 can assume other geometry and need not extend from the interface 240 parallel to the split line axis 245. For example, an edge of the side protrusion 280 can be angled, relative the split line axis 245, toward or away from the body part 215, or curved convexly (i.e. toward the body part 215) or concavely (i.e., curving away from the body part 215). The side protrusion 280 can immediately adjoin the outside edge of coupling surface 260, as shown in the example of FIG. 2A, or be positioned elsewhere on the perimeter edge of the cap part 205 spaced apart from the coupling surface 260.

Figure 3:
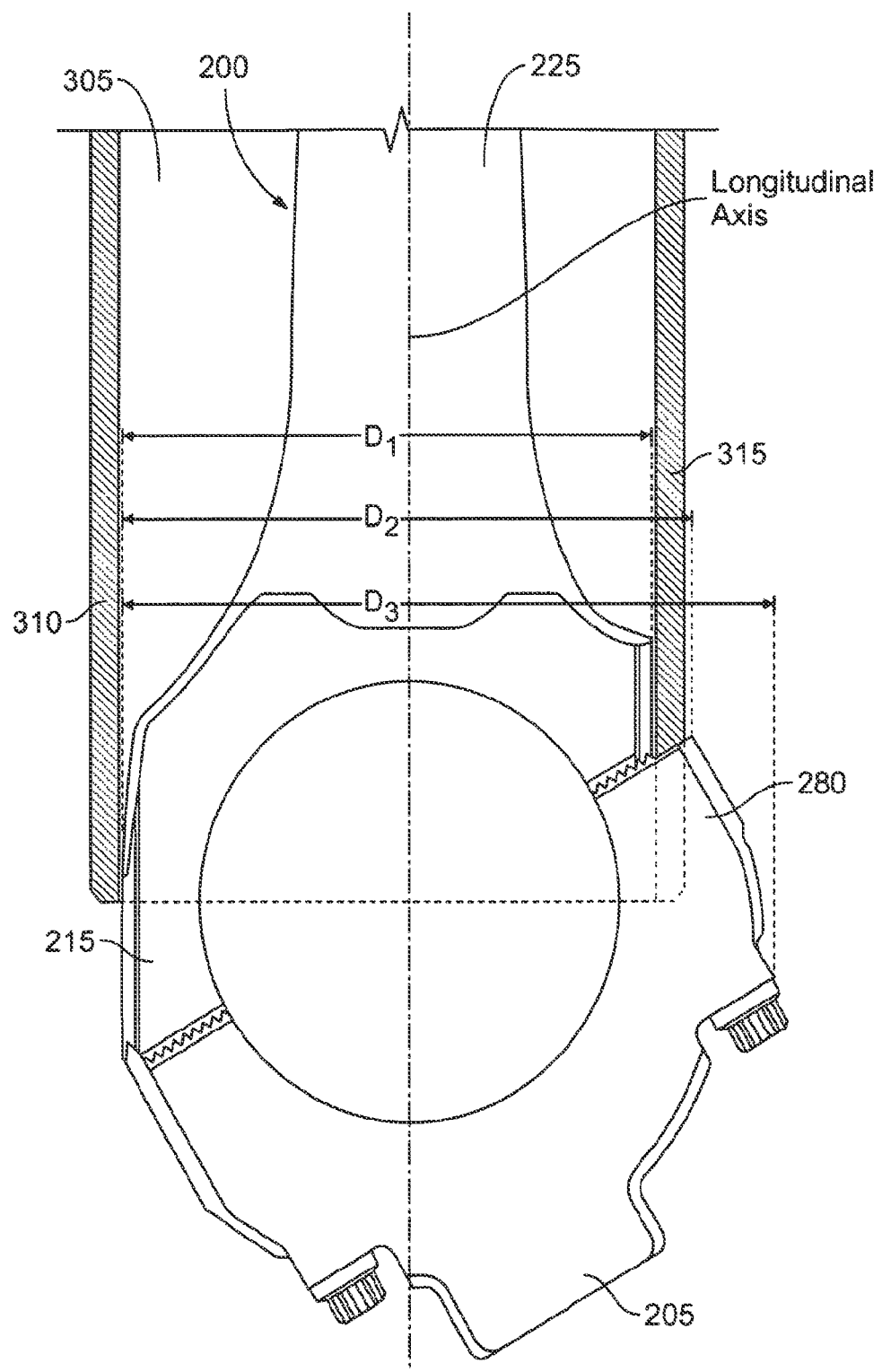
FIG. 3 is a cross-sectional view of the connecting rod of FIG. 2A superimposed on a cross-sectional view of an engine cylinder liner, both depicted proportionally to scale.

FIG. 3 illustrates the connecting rod 200 of FIG. 2A, superimposed on a cross-sectional reference diagram of a piston cylinder 305. As shown in reference FIG. 3, the lateral dimensions of the small end 230, the connecting rod shank 225, and body part 215 (i.e., measured transverse to the longitudinal axis of the rod shank) are smaller than the inner diameter of the cylinder liner walls 310, 315 such that the small end 230, rod shank 225 and body part 215 can pass through the cylinder 305. This arrangement allows for this portion of the connecting rod assembly 200 to be installed and passed through the cylinder 305 during manufacture and maintenance of the assembly 200 or the connected piston and crankshaft. In contrast, the lateral dimension of the cap part 205 is larger than connecting rod sections 215, 225, 230, and the inner diameter of the cylinder walls 305. Thus, the cap part 205 cannot pass through the cylinder when the cap part 205 is attached to the body part 215.

A number of implementations have been described. Nevertheless, it will be understood that various modifications may be made. For example, extra supportive material may be provided on both sides of the cap part. Accordingly, other implementations are within the scope of the following claims.

What is claimed is:

1. A connecting rod for coupling a piston to a crank pin, comprising:
   an elongate rod shank with opposite first and second axial ends;
   a small end at the first axial end of the rod shank and adapted to couple to the piston; and
   a big end comprising:
      a body part at the second axial end of the rod shank; and
      a cap part adapted to releasably couple to the body part, when the cap part is coupled to the body part, the cap part and body part cooperate to define a crank pin receiving bore and abut at first and second spaced apart interfaces that are not orthogonal to a longitudinal axis of the rod shank,
         the cap part defining an aperture proximate the first interface adapted to receive a threaded fastener that engages and clamps the cap part to the body part,
         the cap part comprising a single side protrusion extending radially adjacent said first interface beyond a largest radius from a crank pin bore center to the first interface, the single side protrusion substantially radially concentrated adjacent and parallel to the first interface, and a largest dimension of the connecting rod cap part measured transverse to the longitudinal axis of the rod shank being larger than a largest dimension of the body part measured transverse to the longitudinal axis of the rod shank.

2. The connecting rod of claim 1, wherein the cap part and the body part comprise interlocking peaks and valleys at the first interface.

3. The connecting rod of claim 2, wherein the cap part and the body part are manufactured by cracking the cap part from a unitary big end piece to form distinct body part and cap part elements.

4. The connecting rod of claim 1, wherein the single side protrusion extends radially beyond the body part about the first interface.

5. The connecting rod of claim 1, wherein the single side protrusion of the cap part extends radially beyond the first interface in an amount greater than the body part extends radially beyond the first interface.

6. The connecting rod of claim 1, wherein the single side protrusion extends radially beyond the first interface in an amount greater than the cap part extends radially beyond the second interface.

7. The connecting rod of claim 1, wherein a total volume of the single side protrusion radially beyond a plane through an end of the first interface and orthogonal to the first interface has a centroid, and wherein the centroid resides radially within a smallest radius from the crank pin bore center to a perimeter of the cap part.

8. The connecting rod of claim 7, wherein the centroid resides in a section parallel with the first interface and displaced from the first interface by an angle of 25 degrees.

9. The connecting rod of claim 1, wherein the single side protrusion resides radially within a largest radius from the crank pin center to a perimeter of the cap part.

10. The connecting rod of claim 1, wherein the single side protrusion extends radially adjacent said first interface to form an acute angle with the body part.

11. The connecting rod of claim 10, where the first and second interfaces are coplanar.

12. An engine, comprising:
   an engine block defining a piston cylinder;
   a crank having a crank pin and being supported to rotate in the engine block;
   a piston residing in the piston cylinder; and
   an elongate connecting rod connecting the crank to the piston, the connecting rod coupled to the crank pin at a big end of the connecting rod, the big end comprising:
      a body part; and
      a cap part releasably coupled to the body part by a plurality of threaded fasteners and abutting the body part at first and second spaced apart interfaces that are not orthogonal to a longitudinal axis of the connecting rod, the cap part, in a region adjacent the first interface, extending laterally beyond and parallel to the first interface and having a lateral dimension greater than an inner diameter of the cylinder and smaller than a largest lateral dimension of the connecting rod.

13. The engine of claim 12, wherein the cap part and the body part comprise interlocking peaks and valleys at the first interface.

14. The engine of claim 12, wherein a largest radius from a center of the crank pin to the cap part adjacent the first interface is approximately the same as a smallest radius from the center of the crank pin to a perimeter of the cap part.

15. The engine of claim 12, wherein the cap part extends radially beyond the first interface in an amount greater than the body part extends radially beyond the first interface.

16. The engine of claim 12, wherein the first and second interfaces are not orthogonal to a longitudinal axis of the connecting rod.

17. The engine of claim 16, where the first and second interfaces are coplanar.

18. The engine of claim 12, wherein at least one of the threaded fasteners extends through the first interface.

19. The engine of claim 12, wherein the engine block includes a side access portal oriented so as to allow servicing of at least one of the fasteners, the cap part, or the body part.

20. A method of operating an engine, comprising:
   connecting a piston that is reciprocating within a cylinder of the engine to a crank of the engine with an elongate connecting rod, the elongate connecting rod comprising a body part and a cap part releasably coupled to the body part by a plurality of threaded fasteners and abutting the body part at first and second spaced apart interfaces that are not orthogonal to a longitudinal axis of the connecting rod; and
   providing additional rigidity to the connecting rod with a region of the cap part adjacent the first interface that extends laterally beyond and parallel to the first interface, the cap part, in the region adjacent the first interface has a largest lateral dimension that is greater than an inner diameter of the cylinder and smaller than a largest lateral dimension of the connecting rod.

21. The method of claim 20, further comprising providing support to loads exerted by the crank on the connecting rod with interlocking peaks and valleys at the first interface.

22. The method of claim 20, wherein the portion of the cap part extending radially beyond the first interface is substantially radially concentrated adjacent the first interface.

* * * * *